United States Patent
Blondé et al.

(10) Patent No.: US 7,899,242 B2
(45) Date of Patent: Mar. 1, 2011

(54) METHODS OF PROCESSING AND DISPLAYING IMAGES AND DISPLAY DEVICE USING THE METHODS

(75) Inventors: Laurent Blondé, Thorigne Fouillard (FR); Virginie Hallier, Rennes (FR); Jonathan Kervec, Paimpont (FR)

(73) Assignee: Thomson Licensing, Boulogne-Billancourt (FR)

( * ) Notice: Subject to any disclaimer, the term of this patent is extended or adjusted under 35 U.S.C. 154(b) by 1091 days.

(21) Appl. No.: 10/572,088

(22) PCT Filed: Sep. 6, 2004

(86) PCT No.: PCT/EP2004/009947
§ 371 (c)(1),
(2), (4) Date: Jan. 5, 2007

(87) PCT Pub. No.: WO2005/027529
PCT Pub. Date: Mar. 24, 2005

(65) Prior Publication Data
US 2007/0121996 A1    May 31, 2007

(30) Foreign Application Priority Data
Sep. 17, 2003    (FR) .................................. 03 50557

(51) Int. Cl.
*G06K 9/00*    (2006.01)

(52) U.S. Cl. ........................ 382/162; 382/166; 382/167; 382/284

(58) Field of Classification Search ................. 382/162, 382/284, 100, 166, 167, 154; 358/540, 534, 358/3.19; 347/3, 44, 47, 3.44
See application file for complete search history.

(56) References Cited

U.S. PATENT DOCUMENTS

| | | | | |
|---|---|---|---|---|
| 5,855,433 A | * | 1/1999 | Velho et al. | .................. 382/162 |
| 5,984,446 A | * | 11/1999 | Silverbrook | .................... 347/3 |
| 6,018,374 A | | 1/2000 | Wrobleski | |
| 7,136,522 B2 | * | 11/2006 | Harrington et al. | .......... 382/166 |
| 7,215,792 B2 | * | 5/2007 | Sharma et al. | ............... 382/100 |
| 7,269,297 B2 | * | 9/2007 | Loce et al. | ................... 382/284 |
| 2003/0123663 A1 | | 7/2003 | Epstein et al. | |

FOREIGN PATENT DOCUMENTS

| | | |
|---|---|---|
| EP | 1237369 | 9/2002 |
| WO | WO 98/33331 | 7/1998 |

OTHER PUBLICATIONS

Search Report Dated Nov. 19, 2004.

* cited by examiner

*Primary Examiner*—Anh Hong Do
(74) *Attorney, Agent, or Firm*—Robert D. Shedd

(57) ABSTRACT

The invention discloses modification of pixels of an image in such a way that the average of the colors of the pixel in the modified image equals the average of the colors of the pixel in the source image, such that the human perception of the modified image is the same as the source image, while a camcorder will record an unsatisfactory mixture of the modified colors.

13 Claims, 2 Drawing Sheets

METHODS OF PROCESSING AND DISPLAYING IMAGES AND DISPLAY DEVICE USING THE METHODS

This application claims the benefit, under 35 U.S.C. §365 of International Application PCT/EP04/09947, filed Sep. 6, 2004, which was published in accordance with PCT Article 21(2) on Mar. 24, 2005 in English and which claims the benefit of French patent application No. 0350557, filed Sep. 17, 2003.

The invention relates to a device and to a method for displaying images.

The visual contents, whether these be fixed or moving images, are in general creations that benefit from guarantees of exclusivity associated with the creator's rights. Their reproduction is in general permitted only within a strictly defined framework that allows the creators and their beneficiaries to be remunerated.

To ensure that these legal rules are complied with correctly, many systems have been developed to prevent illegal copies or to make the quality of the copies sufficiently degraded to make them unusable.

Within this context, Patent Application EP 1 237 369 aims to combat the copying of images by means of a camera while they are being displayed, for example using a camcorder in a cinema. For this purpose, it has been proposed to modulate the intensity of the pixels with a feature around the value to be displayed at a high rate that makes the feature invisible to the human eye but generates artefacts in the sequence filmed by the camcorder.

Such a solution requires modulation at a rate higher than the flicker fusion frequency, which is of around 60 Hz, and therefore applies only to systems having a high image refresh rate, at least of around 100 Hz. Applied to systems with a lower display rate (50 Hz or 60 Hz for example), the modulation could be visible to the human eye and would visibly degrade the rendition of the displayed image.

To avoid these problems, and especially to propose a solution that applies to a wider range of display devices, the invention proposes a method of processing a source image generating at least two successive processed images, in which the colour of at least one pixel in each processed image is different from the colour of the pixel in the source image, and in which the modified colours of the pixel in each processed image offset each other in order to obtain a colour corresponding to the colour of the pixel in the source image.

The images are thus altered without this being prejudicial to the rendering as regards the human eye, even at relatively low rates compared with the prior art.

Preferably, the luminance of said pixel in each processed image is equal to the luminance of the pixel in the source image.

According to the same concept, the invention proposes a method of processing a first set of images that generate a second set of images, in which the colour of at least one pixel in the first image of the second set is different from the colour of the pixel in the first image of the first set and in which the resulting colour of the pixel in the images of the second set is the resulting colour of the pixel in the images of the first set.

Preferably, the luminance of said pixel in the first image of the second set is equal to the luminance of the pixel in the first image of the first set.

In general, the colour of a pixel is defined by the chrominance of said pixel.

The invention thus proposes a method of processing at least one source image into a plurality of processed images, comprising the steps of:

modification of the chrominance in at least one pixel of the source image; and calculation of the chrominance of said pixel in the processed images, in such a way that the average of the chrominances of said pixel in the processed images is equal to the average of the chrominances of said pixel in the image source or sources.

The luminance of said pixel is preferably unchanged.

Employed for displaying, the invention therefore proposes a method for displaying images on the basis of at least one source image, in which a plurality of images are displayed in succession and in which, in at least one pixel, the colour of the displayed images is different from the colour in the source image and the resultant of the colours of the displayed images is the resultant of the colour in the source image.

In terms of the device, the invention proposes a device for displaying images on the basis of at least one source image, in which a plurality of images are displayed in succession and in which, in at least one pixel, the colour of the displayed images is different from the colour in the source image and the resultant of the colours of the displayed images is the resultant of the colour in the source image.

The luminance of the displayed images is preferably equal to the luminance in the source image. The colour of a pixel is in general defined by the chrominance of said pixel.

According to one embodiment, the display rate is greater than the frequency for colour fusion by the human eye, for example greater than 20 Hz.

Other features and advantages of the invention will become apparant in the light of the detailed description that is given with reference to the appended figures in which.

The description below will be given within the context of images coded in digital form, but the invention is of course not limited to this type of coding. Within this context, the image or images to be displayed are described by data stored in a data medium 2, such as an optical disk, a hard disk or a magnetic tape. This data may also come from a broadcasting channel (for example, radio, satellite, cable or ADSL). The display system 4 receives this data in the form of a source stream, which thus represents the image or the sequence of images to be displayed.

Figure 1:
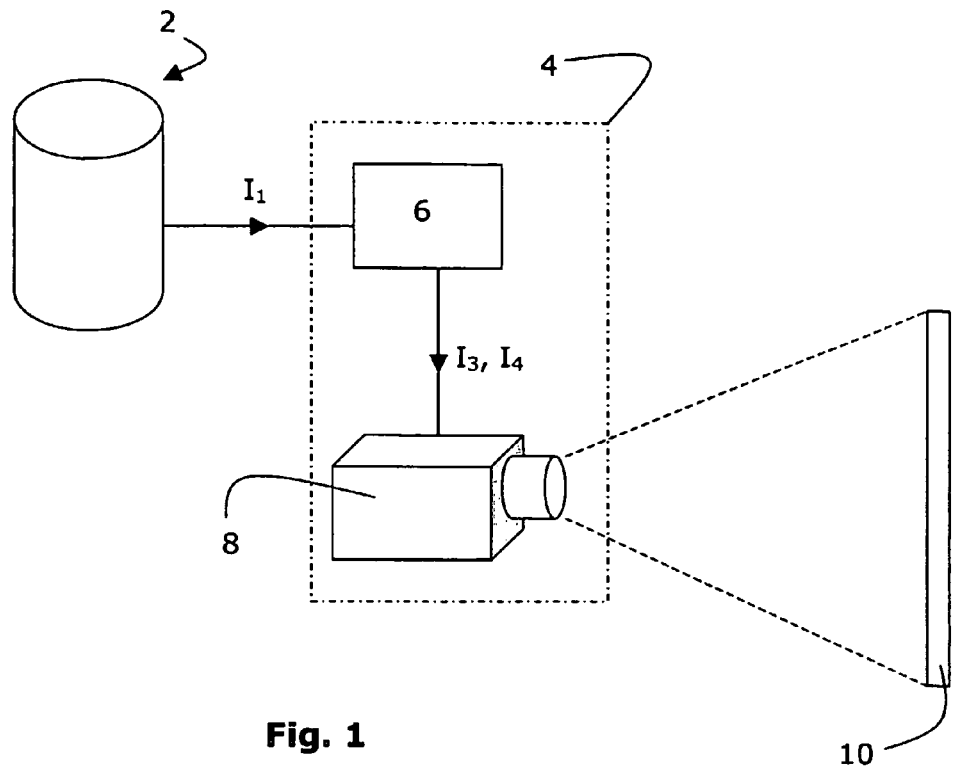
FIG. 1 shows a diagram illustrating the principle of a first embodiment of the invention.

According to a first embodiment shown in FIG. 1, each image $I_1$ of the source stream gives rise to the display of two images $I_3$ and $I_4$ on the display device (for example a projector 8 with a screen 10). In the case of moving images, the display rate is therefore twice the image rate in the source stream. Moreover, it may be pointed out that this embodiment, which could use only a single source image $I_1$, applies of course to the case of a fixed image.

The source image $I_1$ is converted in succession into two displayed images $I_3$, $I_4$ by a processing circuit 6, the operation of which will now be described in detail.

Overall, the processing circuit 6 makes it possible to modulate the colour of the pixels with a feature, while maintaining their luminance, that is to say the light intensity of each pixel, at the level defined in the source image. The processing circuit therefore leaves unchanged the values of the pixels located away from the feature.

In theory, the feature is any set of pixels. In practice, it may define a message that the modulation could cause to appear if it were to be filmed by a camcorder. It would even be possible to provide for the feature to comprise all of the pixels of the image, which would considerably degrade the image in the event of illegal recordings; however this solution may be irksome in the case of large screens because of the higher flicker sensitivity in the peripheral regions of the eye.

The processing carried out on each pixel P of the feature, defined in the source image by the triplet $R_1, G_1, B_1$ according to the commonly used RGB standard, will now be described, each value being, for example, coded over 8 bits (between 0 and 255).

To carry out the colour modulation at constant luminance in a precise manner, a colorimetric space of the luminance/chrominance type is defined, for example the space YUV. Within this new reference frame, the colorimetric coordinates of the pixel P are here:

$$\begin{cases} Y_1 = 0.3 * R_1 + 0.59 * G_1 + 0.11 * B_1 \\ U_1 = -0.17 * R_1 - 0.34 * G_1 + 0.51 * B_1 + 128 \\ V_1 = 0.51 * R_1 - 0.43 * G_1 - 0.082 * B_1 + 128. \end{cases}$$

Preferably, an inverse function of the conventional gamma function is applied so as to work in a linear digital space relative to the display space.

As already mentioned, the processing circuit 6 preserves the luminance of the displayed images at the luminance of the source signal $I_1$. In the case of pixel P, the luminance $Y_3$ in the image $I_3$ and the luminance $Y_4$ in the image $I_4$ will therefore be simply defined by:

$Y_3 = Y_1$ and $Y_4 = Y_1$.

In contrast, the chrominance components $U_1, V_1$ are modified by the processing circuit so as to degrade the image such that it could be picked up by a camera. However, measures are taken to ensure that the images $I_3$ and $I_4$ follow each other at a rate higher than the frequency for colour fusion and that the modified colours offset each other in order to obtain the desired colour (defined in the source image).

These constraints are reflected in the following general equations in which $U_3, V_3$ are the chrominance components of the pixel P in the image $I_3$ and $U_4, V_4$ are the chrominance components of the pixel P in the image $I_4$:

$U_3 = g(U_1, V_1)$ and $V_3 = h(U_1, V_1)$ $(U_3 + U_4)/2 = U_1$ $(V_3 + V_4)/2 = V_1$.

Figure 2:
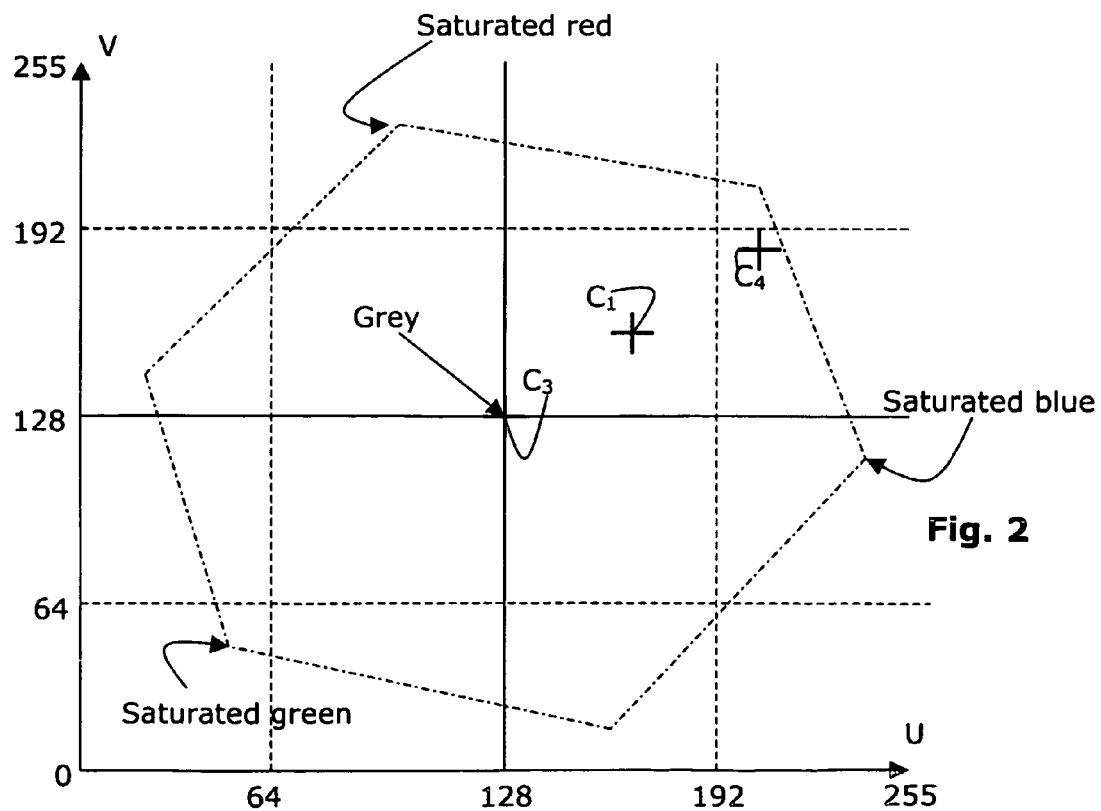
FIG. 2 is a representation in a colour plot of the processing carried out in the first embodiment.

Represented in a conventional chromaticity plot as in FIG. 2, the last two equations indicate that the colour $C_1$ (with coordinates $U_1, V_1$) that the display device has to present to the eye at the point P is obtained by the fusion by the eye of the colours $C_3$ (with coordinates $U_3, V_3$) and $C_4$ ($U_4, V_4$) actually displayed.

More precisely, FIG. 2 shows the various colours considered in the (O, U, V) plane. In the representation over 8 bits given here by way of example, the point with coordinates (128, 128) corresponds to grey. In this plot, the saturation therefore increases with the distance from the point of coordinates (128, 128).

From the above equations, the point $C_1$ is the middle of the segment $C_3C_4$, so that the resultant for the eye of the colours $C_3$ and $C_4$ that are actually displayed is the colour $C_1$. We speak here of the middle owing to the fact that the colours $C_3$ and $C_4$ are displayed for the same period (for example around 20 ms). Of course, a system could also be provided in which the display time can vary from one image to another; in this case, the resultant colour for the eye would be the barycentre of the colours actually displayed, weighted by the display time of each colour.

For one particularly simple case, it is possible to use the function $f$ defined by:

$$\begin{cases} \text{if } 0 \leq x \leq 63 & f(x) = 2.x \\ \text{if } 63 < x < 192 & f(x) = 128 \\ \text{if } 192 \leq x \leq 255 & f(x) = 2.x - 255 \end{cases}$$

and to determine the colorimetric coordinates of the point P in the image $I_3$ by $U_3 = f(U_1)$ and $V_3 = f(V_1)$, limiting however the values of $U_3$ and $V_3$ according to the following inequations so that none of the triplets $(Y_3, U_3, V_3)$ and $(Y_4, U_4, V_4)$ lies outside the space addressable in RGB over 8 bits:

$$\begin{cases} V_1 - \dfrac{255 - R_1}{1.36} \leq V_3 \leq V_1 + \dfrac{R_1}{1.36} \\ U_1 - \dfrac{255 - B_1}{1.73} \leq U_3 \leq U_1 + \dfrac{B_1}{1.73} \end{cases}$$

$$\begin{cases} 128 - \dfrac{Y_1}{1.36} \leq V_3 \leq 128 + \dfrac{255 - Y_1}{1.36} \\ 128 - \dfrac{Y_1}{1.73} \leq U_3 \leq 128 + \dfrac{255 - Y_1}{1.73} \end{cases}$$

$$V_1 - \dfrac{1}{0.69}[G_1 - 0.33 * (U_1 - U_3)] \leq$$

$$V_3 \leq V_1 + \dfrac{1}{0.69}[255 - [G_1 - 0.33 * (U_1 - U_3)]].$$

Once the colorimetric coordinates $U_3, V_3$ of the pixel P in the image $I_3$, have been calculated, the colorimetric coordinates in the image $I_4$ are easily obtained by the above general equations which give:

$U_4 = 2.U_1 - U_3$ and $V_4 = 2.V_1 - V_3$.

Thus, the colorimetric coordinates of the pixel P of the images $I_3$ and $I_4$, are completely determined, this calculation having to be carried out with the set of pixels of the feature.

Of course, before the displaying, these values are expressed in the reference frame used by the display device 8, here by applying the conventional gamma function and then returning to the RGB reference frame using the following equations:

$$\begin{cases} R = Y + 1.36 * (V - 128) \\ G = Y - 0.33 * (U - 128) - 0.69 * (V - 128) \\ B = Y + 1.73 * (U - 128). \end{cases}$$

The images $I_3$ and $I_4$ are therefore displayed in succession by means of the display device, for example for an identical time of around 20 ms. As was seen above, the display time could be different for each image.

Of course, in the case of the display of a fixed image, the successive displaying of the images $I_3$ and $I_4$ will be periodically refreshed.

The use of the function $f$ as indicated above will result in a strong desaturation of the pixels of the feature in the image $I_3$ and a corresponding supersaturation of the pixels of the feature in the image $I_4$. As indicated above, since the images $I_3$ and $I_4$ are displayed in succession at a rate (for example 50 Hz) that is higher than the frequency for colour fusion by the human eye, the resulting colour perceived by the human eye at the feature is the colour $C_1$ contained in the source image $I_3$ and the feature is therefore invisible to the human eye.

In contrast, the rendering will be degraded appreciably for a camera not synchronized with the display since the colours in the filmed image ($I_3$ or $I_4$) will be false (desaturated or supersaturated) in the feature.

A second embodiment of the invention proposes to process images of the source stream in pairs and, for each pair of images thus considered, to generate as output two modified images for the purpose of displaying them. This embodiment is therefore suitable for the case in which the sourced stream rate is equal to the display rate.

Figure 3:
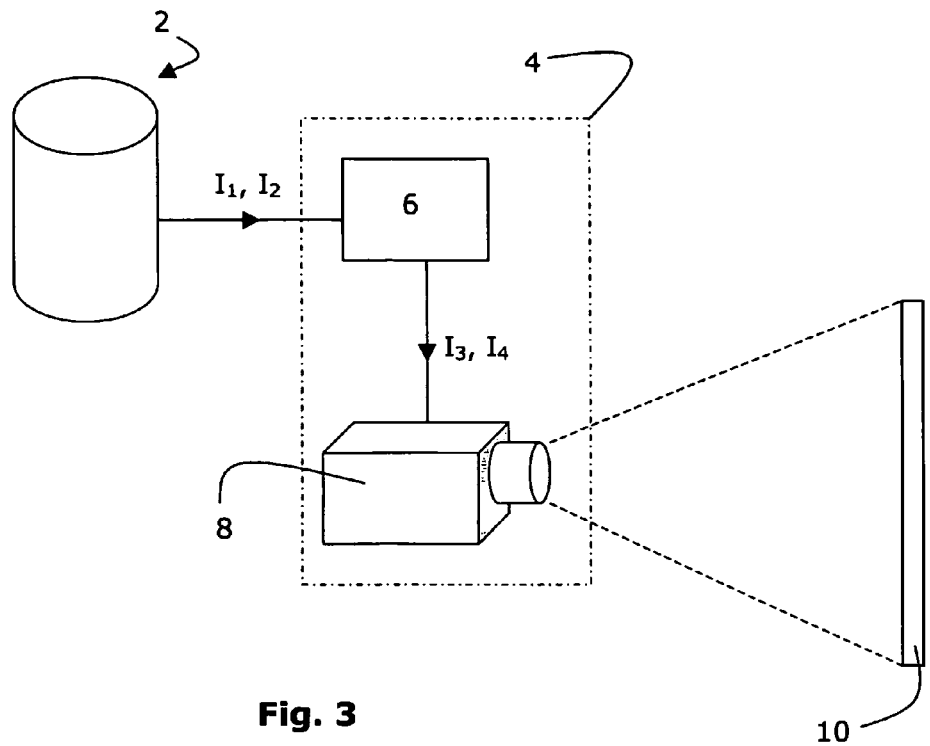
FIG. 3 shows a diagram illustrating the principle of a second embodiment of the invention.

As shown in FIG. 3, the images of the source stream coming from the data medium 2 are grouped together in pairs of successive images $I_1$, $I_2$. Each pair $I_1$, $I_2$ is processed by the processing circuit 6 as indicated in detail below so as to obtain an image pair $I_3$, $I_4$ for display (by the display system 8, 10 as previously). Successive display of the images $I_1$ and $I_2$ is carried out at a higher rate than the frequency for colour fusion by the human eye (without being necessarily higher than the flicker fusion frequency). For example, a display rafe of 50 Hz will be adopted.

The processing circuit 6 modifies the chrominance of the pixels of a predetermined feature, as explained in detail below, but leaves unchanged the values (for example the RGB values) relating to the pixels located outside the features.

For each pixel P of the feature, the RGB colorimetric values of which (coded over 8 bits) in the source flux are respectively $R_1$, $G_1$, $B_1$ in the case of the first image $I_1$ and $R_2$, $G_2$, $B_2$ in the case of the second image $I_2$, the following processing steps are carried out:

transition into a luminance/chrominance-type colorimetric space using formulae of the type:

$$\begin{cases} Y = 0.3*R + 0.59*G + 0.11*B \\ U = -0.17*R - 0.34*G + 0.51*B + 128 \\ V = 0.51*R - 0.43*G_1 - 0.082*B + 128 \end{cases}$$

so as to obtain the colorimetric coordinates $Y_1$, $U_1$, $V_1$ and $Y_2$, $U_2$, $V_2$ of the pixel P in the images $I_1$, and $I_2$;

application of an inverse gamma function;

preservation of the luminance and modification of the chrominance components, while still keeping an average chrominance equal to the average chrominance in the source image (averages effected over the number of images taken into account, in this case over the image pairs $I_1$, $I_2$ and $I_3$, $I_4$). This step may be described by the following general formulae:

$Y_3 = Y_1$ and $Y_4 = Y_2$ $U_3 = g(U_1, V_1, U_2, V_2)$ and $V_3 = h(U_1, V_1, U_2, V_2)$ $U_3 + U_4 = U_1 + U_2$ $V_3 + V_4 = V_1 + V_2$;

application of the gamma function to the colorimetric coordinates determined, $Y_3$, $U_3$, $V_3$ and $Y_4$, $U_4$, $V_4$, of the pixel P in the images $I_3$ and $I_4$ respectively; and return to the RGB-colorimetric space (used for the display) using the general formulae:

$$\begin{cases} R = Y + 1.36*(V - 128) \\ G = Y - 0.33*(U - 128) - 0.69*(V - 128). \\ B = Y + 1.73*(U - 128). \end{cases}$$

As in the case of the first embodiment, it is possible to use in practice the simplified approach consisting in using the function $f$ defined above (as particular g and h function) and to take $U_3 = f(U_1)$ and $V_3 = f(V_1)$.

However, as previously, the excursion of the $U_3$ and $V_3$ values is limited using the following inequalities in such a way that $R_3$, $G_3$, $B_3$ and $R_4$, $G_4$, $B_4$ remain within limits addressable over 8 bits, i.e. between 0 and 255:

$$\begin{cases} 128 - \dfrac{Y_1}{1.36} \le V_3 \le 128 + \dfrac{255 - Y_1}{1.36} \\ 128 - \dfrac{Y_1}{1.73} \le U_3 \le 128 + \dfrac{255 - Y_1}{1.73} \end{cases}$$

$$\begin{cases} \dfrac{1}{2}\left[V_1 + V_2 - \dfrac{510 - (R_1 + R_2 + Y_2 - Y_1)}{1.36}\right] \le V_3 \le \\ \qquad \dfrac{1}{2}\left[V_1 + V_2 + \dfrac{R_1 + R_2 + Y_2 - Y_1}{1.36}\right] \\ \dfrac{1}{2}\left[U_1 + U_2 - \dfrac{510 - (B_1 + B_2 + Y_2 - Y_1)}{1.73}\right] \le U_3 \le \\ \qquad \dfrac{1}{2}\left[U_1 + U_2 + \dfrac{B_1 + B_2 + Y_2 - Y_1}{1.73}\right] \end{cases}$$

$$\dfrac{1}{2}\left[V_1 + V_2 - \dfrac{1}{0.69}[G_1 + G_2 + Y_2 - Y_1 - 0.33*(U_1 + U_2 - 2.U_3)]\right] \le V_3$$

$$V_3 \le \dfrac{1}{2}\Big[V_1 + V_2 + \dfrac{1}{0.69}[510 - [G_1 + G_2 + Y_2 - Y_1 - 0.33*(U_1 + U_2 - 2.U_3)]]\Big]$$

Thanks to the processing described above, the feature will appear to the human eye with a colour identical to the colour that would appear to the eye by direct use of the source stream (i.e. the colour resulting from the colour fusion of the images $I_1$ and $I_2$).

In contrast, a camcorder filming the images in a random manner will record modified colours for the pixels of the features, which will make the copy thus produced unacceptable owing to the unsatisfactory mixing of the modified colours.

Figure 4:
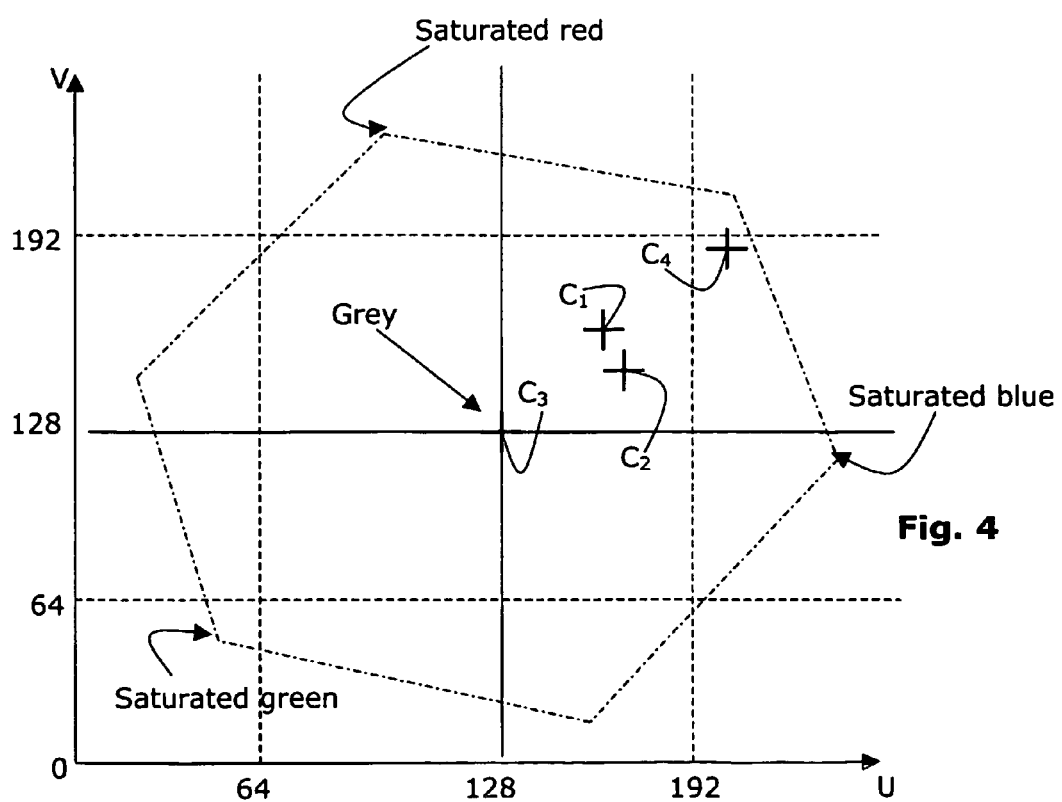
FIG. 4 is a representation in a colour plot of the processing carried out in the second embodiment.

This embodiment, illustrated in FIG. 4 in a plot similar to that of FIG. 2, proposes that the resultant of the colours actually displayed ($C_3$ and $C_4$) corresponds to the resultant of the desired colours ($C_1$ and $C_2$) in the source image, that is to say the middle of the segment $C_3C_4$ coincides with the middle of the segment $C_1C_2$.

Of course, the invention is not limited to the embodiments described above. In particular, it is possible to choose functions g and h other than the function $f$ used above. For example, functions may be chosen that desaturate only one of the components of the image $I_3$ and the other component in the image $I_4$ (for example using formulae of the type $U_3 = f(U_1)$ and $V_4 = f(V_1)$).

Likewise, as described by the use of the general functions g and h, the two components U and V are not necessarily processed in an analogous manner. For example, it is possible to limit the variations made on the component U so as to limit the blue flicker, to which the eye is relatively more sensitive.

The invention claimed is:

1. Method of processing, by a processing circuit, a source image comprising the steps of:
    generating at least two successive processed images; and
    modifying a color of at least one pixel in each processed image, such that the color of the pixel in each processed image is offset about the color of the corresponding pixel in the source image and the luminance of said pixel in each processed image is equal to the luminance of the pixel in the source image.

2. Method according to either of claim 1, wherein the image is formed by a first set of images this first set generating a second set of processed images.

3. Method according to claim 2, wherein the color of at least one pixel in the first image of the second set is different from the color of the pixel in the first image of the first set and in which the modified colors of the pixel in each image of the second set offset each other in order to obtain a color corresponding to the resultant color of the pixel in the images of the first set.

4. Method according to claim 1, in which the color of a pixel is defined by the chrominance of said pixel.

5. Method according to claim 4, comprising the steps of:
    modification of the chrominance in at least one pixel of the source image; and
    calculation of the chrominance of said pixel in the, processed images, in such a way that the average of the chrominances of said pixel in the processed images is equal to the average of the chrominances of said pixel in the image source or sources.

6. Method according to claim 5, in which the luminance of said pixel is unchanged.

7. Method of displaying images on the basis of at least one source image, in which a plurality of images are displayed in succession and in which the displayed images are processed using the method of claim 1.

8. Method according to claim 7, in which the luminance of the displayed images is equal to the luminance in the source image.

9. Method according to claim 7, in which the color of a pixel is defined by the chrominance of said pixel.

10. Method according to claim 7, in which the display rate is greater than the frequency for color fusion by the human eye.

11. Method according to claim 10, in which the display rate is greater than 20 Hz.

12. Processing circuit generating from a source image at least two successive processed images in which a color of at least one pixel in each processed image is different from a color of the same pixel in the source image, and in which modified colors of this pixel in each processed image offset each other in order to obtain a color corresponding to the colour of the pixel in the source image, and the luminance of said pixel in each processed image is equal to the luminance of the pixel in the source image.

13. Device for displaying images on the basis of at least one source image, in which a plurality of images are displayed in succession and the display device comprises a processing circuit according to claim 12.

* * * * *